United States Patent [19]

Gall

[11] 3,981,363
[45] Sept. 21, 1976

[54] PARTIALLY CROSSLINKED POLYMER USED IN CORRECTING SUBTERRANEAN FORMATION PERMEABILITY

[75] Inventor: James W. Gall, Bartlesville, Okla.

[73] Assignee: Phillips Petroleum Company, Bartlesville, Okla.

[22] Filed: Nov. 6, 1975

[21] Appl. No.: 629,357

[52] U.S. Cl. .............................. 166/270; 166/273; 166/294
[51] Int. Cl.² ................. E21B 43/22; E21B 33/138
[58] Field of Search ........... 166/270, 273, 274, 294, 166/295, 300

[56] References Cited
UNITED STATES PATENTS

| | | | |
|---|---|---|---|
| 3,306,870 | 2/1967 | Eilers et al. | 166/295 X |
| 3,396,790 | 8/1968 | Eaton | 166/270 |
| 3,658,129 | 4/1972 | Lanning et al. | 166/294 X |
| 3,757,863 | 9/1973 | Clampitt et al. | 166/270 X |
| 3,762,476 | 10/1973 | Gall | 166/294 |
| 3,785,437 | 1/1974 | Clampitt et al. | 166/294 X |
| 3,809,160 | 5/1974 | Routson | 166/294 |
| 3,833,061 | 9/1974 | Gall | 166/294 |
| 3,926,258 | 12/1975 | Hessert et al. | 166/294 |

*Primary Examiner*—Stephen J. Novosad

[57] ABSTRACT

A method is provided for obtaining good residual resistance factor at relatively low ratios of crosslinking agents to polymer for plugging fractured or porous media using a method of injecting into the formation a first aqueous polymer solution followed by an injection of crosslinking agents capable of gelling the polymer solution and thereafter injecting a second aqueous polymer solution that is capable of being gelled by the crosslinking agents. In each of the aqueous polymer solutions the polymer is already partially crosslinked before the polymer solution is injected into the formation. This process is applicable to production wells and injection wells.

9 Claims, No Drawings

PARTIALLY CROSSLINKED POLYMER USED IN CORRECTING SUBTERRANEAN FORMATION PERMEABILITY

BACKGROUND OF THE INVENTION

This invention relates to the treatment of fractured or porous media in well bore-penetrated subterranean formations. In another aspect this invention relates to prolonging mobility control and/or plugging of a well bore-penetrated subterranean formation through applications of thickened aqueous solutions and controlling the gellation of these solutions.

In U.S. Pat. No. 3,762,476 a method is set forth for overcoming the problem of the production of large amounts of water from oil wells and gas wells. Production of large amounts of water constitutes one of the major items of expense in the overall recovery of hydrocarbons from oil and gas wells. It is stated in that patent that since many oil wells produce a gross effluent comprising 80 to 98 percent by volume of water and only 2 to 20 percent by volume of oil that most of the pumping energy in producing a well is expended in lifting water from the well. In such production further expense is incurred by the separation procedures required to recover water-free hydrocarbons and the disposal of the fouled water separated from the hydrocarbons. That patent sets forth the method for injecting into a subterranean formation through a well bore a first aqueous solution thickened with polymer, following this with a crosslinking ionic solution, a brine slug, and then a second thickened aqueous solution, after which the injections are terminated and hydrocarbon fluids are once more recovered from the subterranean formation. By this method the injected polymer solutions comprise polymer that is not previously crosslinked to form a gel until the underground formations have been penetrated by the solution and subsequently by the agents suitable for crosslinking the polymer.

Probably the main reason for using the uncrosslinked polymer in the aqueous solutions is the well-known fact that polymeric solutions that have crosslinked sufficiently to form a gel are notoriously hard to circulate or to inject into an underground formation with sufficient penetration to achieve more than face plugging of permeable formations. I have now discovered that between the extremes of no crosslinking and crosslinking of the polymer solutions sufficient to cause substantial gelling of the solutions there is a definite advantage to injecting partially crosslinked polymer solutions into the underground formation in an operation using consecutive injection of polymer followed by crosslinking and again followed by polymer solution. This process is most effective in highly permeable or fractured reservoirs. The more highly permeable the reservoir the greater the degree of crosslinking of injected polymer that can be effectively used since the pumping power necessary for injecting the polymer into the reservoir depends upon both the permeability of the zones and the degree of crosslinking of the polymer solution.

It is therefore an object of this invention to provide a method for prolonging the mobility control and/or plugging through the application of partially crosslinked polymer solutions into a permeable reservoir with further crosslinking and gelation in situ.

Other objects, aspects and the various advantages of this invention will become apparent upon reading the specification and the appended claims.

STATEMENT OF THE INVENTION

Broadly, the invention comprises injecting into a subterranean formation through a well bore a first solution containing a partially crosslinked polymer, followed by the injection of additional crosslinking agents, which in turn is followed by the injection of a second solution containing a partially crosslinked polymer to obtain in depth penetration and gelation in the permeable reservoir strata so that a relatively high residual resistance factor is attained.

For the purposes of this invention, "resistance factor" is defined as the mobility of the aqueous liquids in the subterranean formation before the addition of polymer solution, divided by the mobility of the polymer solution. A "residual resistance factor" is defined as the mobility of the aqueous liquid in the subterranean formation before the addition of polymer solution, divided by the mobility of the aqueous liquid in the subterranean formation after the addition of the polymer solution. Resistance factor is of interest during injection and residual resistance factor is a term for the demonstration of the results of the polymer injection.

The method of this invention provides a prolonged high residual resistance factor through the application of multiple injections of aqueous solutions of partially crosslinked polymer interspaced with injection of polymer-crosslinking agents in the form of ionic solutions. The resulting residual resistance factor achieved by the method of this invention is greater than that produced by single thickening agent solution treatments and is a more effective process than carrying out the same series of injections using uncrosslinked polymer instead of partially crosslinked polymer.

Although not wishing to be held to any theory of operation of this invention it is believed that the injection of partially crosslinked polymer causes the adherence of the partially crosslinked polymer to the reservoir surface on the first injection of polymer solution with further crosslinking upon injection of complexing agent and the second polymer solution so that stronger gel formation is provided within the structure of the reservoir and a residual resistance factor of greater magnitude attained.

In the application of waterflooding projects, the extent of the water diversion depends upon the magnitude of the residual resistance factor so that the higher the residual resistance factor the more the water is diverted from the high-permeability zones into lower-permeability zones. The duration of the water diversion depends upon the duration of the high value of the residual resistance factor.

Channeling of large volumes of water through oil-depleted high-permeability zones and fractures continues to be a problem faced by the hydrocarbon industry. For example, an isolated high-permeability zone can be plugged at the well bore, but a communicating high-permeability zone must be plugged in depth to prevent water from merely flowing around the narrow plug and back into the high-permeability zone; therefore, there is a need for a method that will produce high residual resistance factor by deeply penetrating into the reservoir to form stoppages.

The method according to the invention provides for decreasing the permeability of high-permeability zones involving sequential injection of aqueous solutions of partially crosslinked polymer and chemically complexing multivalent metal ion which are controlled with retarding anions. Suitable polymers can be selected from the group consisting of polyacrylamides, polyacrylonitrile, partially hydrolyzed polyacrylonitriles, partially hydrolyzed polyacrylamides, polyacrylic acid, polyvinylpyrrolidone, polysaccharides, carboxymethylcellulose, other substituted celluloses, polyvinyl alcohol, polystyrene sulfonates, copolymers of acrylonitrile with acrylic acid or 2-acrylamido-2-methyl-1-propane sulfonic acid, and the like.

Additional polymers suitable for use in the method of this invention are: copolymers of acrylamide and acrylic acid or other vinylic or polyolefinic monomers; partially hydrolyzed copolymers of acrylamide and acrylic acid or other vinylic or polyolefinic monomers, copolymers of acrylonitrile and acrylic acid or other vinylic or polyolefinic monomers; partially hydrolyzed copolymers of acrylonitrile and acrylic acid or other vinylic or polyolefinic monomers; copolymers of acrylic acid and other vinylic or polyolefinic monomers; partially hydrolyzed copolymers of acrylic acid and other vinylic or polyolefinic monomers methylolated or sulfomethylolated forms of the above.

The degree of partial crosslinking of the polymers in the solutions which are injected into the formation depend largely on the permeability of the formation. That is, the level of pre-gelation of the polymer should be high enough that it easily contacts and adsorbs on the surfaces of the high permeability zones such as loose sand or fractures, yet low enough that it can easily be pumped and does not cause excessive face-plugging. The degree of crosslinking is controlled by the amount of crosslinking agent incorporated into the polymer solution. The crosslinking agents are selected multivalent metal cations such as $Al^{+3}$. In general, the polymer solutions will contain an amount of crosslinking agent in the range of from about 0.001 to about 5.0 grams of complexing metal per gram of polymer, preferably from about 0.01 to about 2.0 grams metal per gram polymer, more preferably from about 0.03 to about 0.1 gram metal per gram polymer. Broadly speaking, more crosslinking agent is used when treating zones of very high permeability or when the concentration of polymer in the polymer solution is relatively low. Conversely, smaller amounts of crosslinking agent are used with less permeable formations or when the polymer concentration is relatively high. In any event, the amount of crosslinking agent will be substantial but less than the amount which would prevent substantial penetration of the more permeable zones. Those skilled in the well bore art, which the aid of this disclosure, can routinely identify the specific compositions which are effective for the treatment of specific formations.

The polymer solutions can be prepared in either fresh water or brine. The concentrations of the polymer in the solution can range from about 50 to about 10,000 ppm, more usually from about 200 to about 5,000 ppm. Any suitable procedure for preparing the partially crosslinked polymer solution can be used. For example, the polymer can be dispersed into the given amount of water and the desired amount of crosslinking agent then added. After the reaction has substantially taken place, from a few minutes to a few hours, the solution is ready for injection.

The injections of partially crosslinked polymer solutions are separated by an injection of an ionic crosslinking solution having from 25 ppm to about 10,000 ppm of a multivalent metal cation selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$, complexed with from about 25 to about 10,000 ppm of retarding anions selected from the group consisting of acetate, nitrilotriacetate, tartrate, citrate, tripolyphosphate, metaphosphate, gluconate, and orthophosphate. Repeated third and fourth solutions of partially crosslinked polymer interspaced with injection of complexing anionic solution can also be utilized if desired according to the field conditions or other requirements. The first and second aqueous solutions containing partially crosslinked polymer can be selected from, for example, a partially hydrolyzed polyacrylamide having molecular weight in excess of 200,000 and having from about 1 to about 75 percent of the amide groups thereof hydrolyzed to carboxyl groups. The first and second solutions of partially crosslinked polymer can be the same or any combination of polymers listed hereinabove as well as a variety of partially hydrolyzed polyacrylamides. The complexed crosslinking agents of the polymer solutions and of the intermediate solution can be the same or different.

A well workover according to the method of this invention can be treated with, for example, from about 100 to about 30,000 barrel slugs of the first and subsequent solutions of partially crosslinked polymer. The workover solutions can have a polymer concentration of from about 50 to about 10,000 ppm depending upon the viscosity desired. Inert materials such as ground walnut hulls, asbestos, leather, etc., can be added to the polymer solutions and act as filler or backbone for a filter cake producing thereby low water loss.

In order to illustrate a preferred embodiment of the method of this invention, the use of solutions of partially crosslinked polyacrylamide with aluminum salt to obtain water diversion effects was compared with the use of solutions containing uncrosslinked polyacrylamide. The date presented hereinafter is meant to be illustrative of the effectiveness of the present invention and are not to be taken as restrictive.

EXAMPLE I

A series of runs outside the scope of this invention are presented now so that the improvements of the invention, which will be later shown in Example II, can be fully appreciated. In this series, the plugging effects of a single slug of a mixture of polymer and crosslinking agent is observed.

The data in Table I were determined in one-inch long fractured Berea cores with an average fracture permeability of 2865 darcys. Residual resistance factors (RRF) were developed in fractured Berea cores using mixtures of Dow Pusher 700 (a polyacrylamide having a degree of hydrolysis of about 19 percent) and aluminum citrate. The fluids were mixed and injected until a steady-state resistance factor (RF) was reached or severe face-plugging occurred. The concentration of the polymer in the mixture was 200 ppm. The brine used as the driving fluid contained 88,000 ppm total dissolved solids and the brine into which the polymer mixture was placed contained 1,200 ppm of dissolved solids. The column heading "gram of aluminum/gram of polymer" refers to the ratio of gram of aluminum metal to gram of polymer. Thus, the degree of crosslinking was varied in each run.

TABLE I

| Mix | gram of Al/gram of polymer | RRF to 88,000 TDS Brine |
|---|---|---|
| a | 0.0 | 1 |
| b | 0.027 | 3 |
| c | 0.081 | 4 |
| d | 0.136 | 1200 |
| e | 0.163 | 2980 |
| f | 0.204 | 3300 |
| g | 0.272 | 3250 |
| h | 0.340 | 4720 |

The data show that the polymer solution alone develops little or no resistance to the flow of brine in these fractured cores—up to Mix d little flow resistance was developed. For Mix d and those following, large residual resistance factors (RRF) were developed but these were due to severe faceplugging which is less desirable and which can be decreased by simply washing the face of the core with brine.

EXAMPLE II

These tests were run in a three-inch long fractured Berea core with a pressure tap installed one inch downstream from the injection face. The data presented are for the downstream, two-inch section and thus represent resistance in depth and not merely face-plugging. The fluids were injected in the following sequence: (1) a mixture of Dow Pusher 700 (200 ppm) and aluminum citrate, (varied) as in Example I; (2) a brine solution of aluminum citrate; and (3) a repetition of the first mixture; and (4) brine driving fluid containing 88,000 ppm total dissolved solids. The mixtures were prepared by combining solutions of Dow Pusher 700 and aluminum citrate and had a composition such that there was only light crosslinking and hence little or no face-plugging was obtained by the mixture alone.

TABLE II

| Mix | gram of Al/gram of Polymer | Core Permeability, Darcys | | RRF to 88,000 TDS brine |
|---|---|---|---|---|
| a' | 0.0 | 2090 | | 10.3 |
| b' | 0.027 | 988 | | 118.0 |
| c' | 0.081 | 1297 | | 82.6 |
| d' | 0.136 | 1340 | Face Plugged | 6.5 |

Runs b and c of Table I show that single slugs of the aluminum citrate-polymer mixture scarcely change the RRF, while the same mixture (b' and c' of Table II) of the same mix as before used as two slugs with the brine slug containing aluminum citrate in between caused increase in the RRF. It can be seen that desirable plugging effects are obtainable at lower values of mixture ratio of aluminum citrate and polymer when a sequence method of injection is used in accordance with this invention.

The data in Table II also demonstrate that significant increases in RRF are obtained by the sequential injection of solutions of partially crosslinked polyacrylamides and aluminum citrate over the RRF obtained by the sequential injection of uncrosslinked polyacrylamide and aluminum citrate. Compare run a', the uncrosslinked polyacrylamide, with runs b' and c', partially crosslinked polyacrylamides.

Compare also the data of Tables I and II to see that when substantial face-plugging occurs, as in mix d, little resistance as to the flow of brine is developed in depth. This comparison clearly demonstrates an advantage of this new technique which is the ability to generate large RRF in depth without having to try to force fluids into the cores in depth using polymer solutions which substantially face-plug the cores.

The following calculated example illustrates the advantage of using the inventive process.

EXAMPLE III

This example demonstrates the correction of a subterranean formation permeability by using the inventive process. A formation with a matrix permeability of 200 md and a fracture permeability of 2,000 darcys is chosen for treatment. The area of the matrix exposed in the well bore is 400 times that of the fracture such that only about 4% of the injected water penetrates the matrix and about 96% enters the fracture system. The flow capacities of the fracture and matrix before treatment are given by the expression:

Flow Capacity = Permeability × Relative Area a. For Fracture:

Flow Capacity = 2,000,000 md × 1 ft$^2$

Flow Capacity of Fracture = 2,000,000 md ft$^2$ b. For Matrix:

Flow Capacity = 200 md × 400 ft$^2$

Flow Capacity of Matrix = 80,000 md ft$^2$

Thus, the injected water distributes itself between the fracture and matrix as shown below:

Total Flow Capacity = 2,000,000 + 80,000

= 2,080,000 md ft$^2$

For relative percentages (before treatment) use 2,000,000/2,080,000 × 100

(for fracture taking about 96% of injected water) and 80,000/2,080,000 × 100

(for matrix taking about 4% of injected water)

In accordance with this invention, the injection or production well is treated with the following sequence of ingredients:

a. 500 barrels of a solution containing 0.081 gram of aluminum per gram of polymer
b. 500 barrels of a solution of aluminum citrate (500 ppm Al)
c. repeat injection of (a) This treatment gives a residual resistance factor (RRF) in the fracture of about 118. Any face plugging of the matrix can be cleaned off with acid.

The flow capacity of the fracture after treatment is calculated by the following expression:

$$\frac{\text{Flow Capacity of Fracture Before Treatment}}{\text{Residual Resistance of Fracture After Treatment}} = \frac{2,000,000 \text{ md ft}^2}{118}$$

thus, Flow Capacity of Fracture After Treatment = 16,949 md ft$^2$

Assuming no change in the flow capacity of the matrix after treatment, total Flow Capacity After Treatment = 16,949 + 80,000

= 96,949 md ft$^2$

The following relationship is used to calculate the percentage of injected water entering the fracture after treatment:

$$\frac{16,949}{96,949} \times 100 = \begin{array}{l} 17.4\% \text{ of injected water enters fracture} \\ 82.6\% \text{ of injected water enters matrix} \end{array}$$

As can be seen from the results of this calculated example, a substantially greater percentage of the injected water (82.6% vs. 4%) enters the matrix to displace the oil therein after treatment of the formation with the inventive process.

Reasonable variation and modification are possible within the scope of the foregoing disclosure and the appended claims to the invention, the essence of which is that there has been provided a method for obtaining good residual resistance factor for plugging fractured or porous media by injecting into a formation an aqueous partially gelled polymer solution followed by an injection of crosslinking agents capable of further gelling the polymer solution and then a second injection of aqueous partially gelled polymer solution that can be further gelled by the crosslinking agents. The process is equally applicable to production wells and injection wells and can be used to improve the water injection profile for wells used in water flooding, polymer flooding, surfactant flooding, and miscible flooding.

I claim:

1. A method for treating a subterranean formation which is penetrated by at least one well bore, comprising:
   a. injecting into the formation through a well bore a first aqueous solution of partially crosslinked polymer;
   b. thereafter injecting a complexing ionic solution of multivalent cations and retarding ion; and
   c. thereafter injecting into the formation through the well bore a second aqueous solution of partially crosslinked polymer.

2. A method according to claim 1 wherein said treating is carried out through a producing well penetrating said formation.

3. A method according to claim 1 for improving the water injection profile of wells used in water flooding, polymer flooding, surfactant flooding, and miscible flooding.

4. A method according to claim 3 wherein the polymer is comprised of a partially hydrolyzed polyacrylamide.

5. A method according to claim 1 wherein said first and second aqueous solutions of partially crosslinked polymer comprise a mixture of aqueous polymer solution and an amount of complexing ionic solution of multivalent cations and retarding ions sufficient to partially crosslink said polymer.

6. A method according to claim 5 wherein the complexing ionic solution is aluminum citrate.

7. A method according to claim 1 wherein the first and second aqueous polymer solutions are comprised of from about 200 to about 10,000 ppm of a partially crosslinked polymer selected from the group consisting of polyacrylamides, polyacrylonitrile, partially hydrolyzed polyacrylonitriles, partially hydrolyzed polyacrylamides, polyacrylic acid, polyvinylpyrrolidone, polysaccharides, carboxymethylcellulose, other substituted celluloses, polyvinyl alcohol, polystyrene sulfonates, copolymers of acrylonitrile with acrylic acid or 2-acrylamido-2-methyl-1-propane sulfonic acid; and a complexing ionic solution which is comprised of from about 25 to about 10,000 ppm of multivalent cations selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$, and from about 25 to about 10,000 ppm of retarding anions selected from the group consisting of acetate, nitrilotriacetate, tartrate, citrate, tripolyphosphate, metaphosphate, gluconate, and orthophosphate.

8. A method according to claim 7 wherein said polymer solution contains an amount of crosslinking agent in the range of about 0.01 to about 5 grams of complexing metal per gram of polymer.

9. A method according to claim 1 wherein the first and second polymer solutions are comprised of the same polymer.

* * * * *